US010637570B1

(12) United States Patent
Brinkley et al.

(10) Patent No.: US 10,637,570 B1
(45) Date of Patent: Apr. 28, 2020

(54) ADAPTIVE RATE MODEM

(71) Applicant: X DEVELOPMENT LLC, Mountain View, CA (US)

(72) Inventors: Devin Brinkley, Redwood City, CA (US); Bruce Moision, Palo Alto, CA (US); Paul Csonka, Redwood City, CA (US); Baris Erkmen, Sunnyvale, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

(21) Appl. No.: 16/415,028

(22) Filed: May 17, 2019

Related U.S. Application Data

(60) Provisional application No. 62/793,108, filed on Jan. 16, 2019.

(51) Int. Cl.
*H04B 10/00* (2013.01)
*H04B 10/079* (2013.01)
*H04B 10/11* (2013.01)

(52) U.S. Cl.
CPC ....... *H04B 10/07955* (2013.01); *H04B 10/11* (2013.01)

(58) Field of Classification Search
USPC ........................................................ 398/162
See application file for complete search history.

(56) References Cited

U.S. PATENT DOCUMENTS

| 5,305,468 | A | * | 4/1994 | Bruckert | ............ H04W 52/223 455/69 |
| 5,450,616 | A | * | 9/1995 | Rom | ..................... H04W 52/60 455/69 |
| 5,541,955 | A | * | 7/1996 | Jacobsmeyer | ......... H03D 3/241 375/222 |
| 5,828,947 | A | * | 10/1998 | Michel | ............... H04B 7/18543 455/13.4 |
| 5,999,563 | A | * | 12/1999 | Polley | ................... H04L 1/0003 370/229 |
| 6,141,128 | A | * | 10/2000 | Korevaar | ........... H04B 10/1143 398/1 |
| 6,154,489 | A | * | 11/2000 | Kleider | ................. H04L 1/0001 375/221 |
| 6,252,854 | B1 | * | 6/2001 | Hortensius | ................ H04L 1/08 370/252 |

(Continued)

*Primary Examiner* — Agustin Bello
(74) *Attorney, Agent, or Firm* — Botos Churchill IP Law

(57) ABSTRACT

The disclosure provides a communication system that includes sensors, a plurality of components, and processors. The sensors receive measurements related to a state of the communication system. The processors receive an indication of an amount of received power at a remote communication system and estimate a state of the plurality of components based on the received one or more measurements and the received indication. Using the indication and the estimated state, the processors determine whether the amount of received power is likely to fall below a minimum received power within a given time interval. When it is likely, the processors select an adjustment technique of a plurality of adjustment techniques for adjusting a data rate of the outbound signal and adjust a given component of the communication system using the selected adjustment technique to change the data rate of the outbound signal.

20 Claims, 4 Drawing Sheets

(56) References Cited

U.S. PATENT DOCUMENTS

| | | | | |
|---|---|---|---|---|
| 6,285,481 B1* | 9/2001 | Palmer | H04B 10/118 | |
| | | | 398/119 | |
| 6,658,214 B1* | 12/2003 | Ito | H04B 10/1125 | |
| | | | 398/120 | |
| 6,760,152 B2 | 7/2004 | Ratoff et al. | | |
| 7,016,612 B1* | 3/2006 | Ikeda | H04B 10/1141 | |
| | | | 398/129 | |
| 7,133,441 B1* | 11/2006 | Barlev | H04L 12/2856 | |
| | | | 375/222 | |
| 7,174,179 B2* | 2/2007 | Krebs | H04B 7/18582 | |
| | | | 375/298 | |
| 7,231,559 B2* | 6/2007 | Dacosta | H04L 1/0003 | |
| | | | 714/708 | |
| 7,350,986 B2* | 4/2008 | Ekkizogloy | H04B 10/40 | |
| | | | 385/92 | |
| 7,463,677 B2* | 12/2008 | Chuang | H04L 1/0003 | |
| | | | 375/227 | |
| 7,715,469 B2* | 5/2010 | Chuang | H04L 1/0003 | |
| | | | 375/227 | |
| 7,720,136 B2* | 5/2010 | Friedman | H04L 1/0002 | |
| | | | 375/220 | |
| 7,751,372 B2* | 7/2010 | Monsen | H04B 7/0632 | |
| | | | 370/335 | |
| 8,638,655 B2* | 1/2014 | Geile | G06F 17/14 | |
| | | | 370/208 | |
| 9,166,367 B2* | 10/2015 | Zhu | H04B 10/564 | |
| 9,749,123 B1* | 8/2017 | Zhou | H04B 10/11 | |
| 10,038,497 B2* | 7/2018 | Featherston | H04B 10/07955 | |
| 2001/0006428 A1* | 7/2001 | Mizuno | H04B 10/1143 | |
| | | | 398/126 | |
| 2005/0238357 A1* | 10/2005 | Farrell | H04B 10/1123 | |
| | | | 398/119 | |
| 2011/0087925 A1* | 4/2011 | Haran | H04B 10/077 | |
| | | | 714/37 | |
| 2012/0063773 A1* | 3/2012 | Sluz | H04B 10/1121 | |
| | | | 398/27 | |
| 2017/0126352 A1* | 5/2017 | Chen | H04J 14/0257 | |

* cited by examiner

200

ADAPTIVE RATE MODEM

CROSS REFERENCE TO RELATED APPLICATIONS

This application claims the benefit of the filing date of U.S. Provisional Patent Application No. 62/793,108 filed Jan. 16, 2019, the disclosure of which is hereby incorporated herein by reference.

BACKGROUND

Communication terminals may transmit and receive optical signals through free space optical communication (FSOC) links. In order to accomplish this, such terminals generally use acquisition and tracking systems to establish the optical link by pointing optical beams towards one another. For instance, a transmitting terminal may use a beacon laser to illuminate a receiving terminal, while the receiving terminal may use a position sensor to locate the transmitting terminal and to monitor the beacon laser. Steering mechanisms may maneuver the terminals to point toward each other and to track the pointing once acquisition is established. A high degree of pointing accuracy may be required to ensure that the optical signal will be correctly received.

The mechanisms and components of communication terminals may vary physically due to differences in operation over time. For example, mechanisms may be cycled through large temperature ranges and experience significantly varying plant (mechanism) characteristics. Components may wear or otherwise vary with use, which may change optical throughput or adaptive rate requirements. Mechanisms may also have components that reduce performance using traditional controls techniques. In these situations, it may be difficult to compensate for the variability caused by the changes in the components in order to obtain reliable operation of a communication terminal.

BRIEF SUMMARY

Aspects of the disclosure provide for a communication system configured to transmit an outbound signal to a remote communication system. The communication system includes one or more sensors configured to receive one or more measurements related to a state of the communication system; a plurality of components; and one or more processors in communication with the one or more sensors. The one or more processors are configured to receive, from the remote communication system, an indication of an amount of received power at the remote communication system; estimate a state of the plurality of components based on the received one or more measurements and the received indication; using the received indication and the estimated state of the plurality of components, determine whether the amount of received power is likely to fall below a minimum received power within a given time interval; when it is determined that the amount of received power is likely to fall below the minimum received power within the given time interval, select an adjustment technique of a plurality of adjustment techniques for adjusting a data rate of the outbound signal; and adjust a given component of the communication system using the selected adjustment technique to change the data rate of the outbound signal.

In one example, the adjustment technique is selected based on the estimated state of the plurality of components to determine an amount of information able to be transmitted using a given adjustment technique. In another example, the adjustment technique is selected based on the estimated state of the plurality of components to determine an operating capacity of a component associated with a given adjustment technique. In a further example, the adjustment technique is selected based on the estimated state of the plurality of components to determine an amount of transition time required by a given adjustment technique. In yet another example, the adjustment technique is selected based on the estimated state of the plurality of components to determine a power consumption to the communication system for a given adjustment technique.

In a still further example, the adjustment technique is selected according to one or more of an operating capacity of a component associated with a given adjustment technique, an amount of transition time required by the given adjustment technique, an amount of information able to be transmitted using the given adjustment technique, or a power consumption to the communication system for the given adjustment technique. In another example, the plurality of adjustment techniques includes at least changing a duty cycle of the outbound signal, changing a modulation format of the outbound signal, changing a baud rate of the outbound signal, or changing a bandwidth of the outbound signal. In a further example, the state of the plurality of components is estimated according to an estimated plurality of disturbance values to the communication system for a given timeframe according to the received one or more measurements and the received indication, each disturbance value being associated with a set of components of the communication system.

Other aspects of the disclosure provide for a method of operating a first communication device. The method includes receiving, by one or more processors of the first communication device, an indication of an amount of received power at a second communication device; receiving, by the one or more processors, one or more measurements related to a state of the first communication device; estimating, by the one or more processors, a state of a plurality of components of the first communication device based on the received one or more measurements and the received indication; using the received indication and the estimated state of the plurality of components, the one or more processors determine whether the amount of received power is likely to fall below a minimum received power within a given time interval; when it is determined that the amount of received power is likely to fall below the minimum received power within the given time interval, the one or more processors select an adjustment technique of a plurality of adjustment techniques for adjusting a data rate of an outbound signal from the first communication device; and adjusting, by the one or more processors, a given component of the first communication device using the selected adjustment technique to change the data rate of the outbound signal.

In one example, selecting the adjustment technique includes using the estimated state of the plurality of components to determine an amount of information able to be transmitted using a given adjustment technique. In another example, selecting the adjustment technique includes using the estimated state of the plurality of components to determine an operating capacity of a component associated with a given adjustment technique. In a further example, selecting the adjustment technique includes using the estimated state of the plurality of components to determine an amount of transition time required by a given adjustment technique. In yet another example, selecting the adjustment technique includes using the estimated state of the plurality of components to determine a power consumption to the first communication device for a given adjustment technique.

In a still further example, the adjustment technique is selected according to one or more of an operating capacity of a component associated with a given adjustment technique, an amount of transition time required by the given adjustment technique, an amount of information able to be transmitted using the given adjustment technique, or a power consumption to the first communication device for the given adjustment technique. In another example, the plurality of adjustment techniques includes changing a duty cycle of the outbound signal, changing a modulation format of the outbound signal, changing a baud rate of the outbound signal, or changing a bandwidth of the outbound signal.

Further aspects of the disclosure provide for a non-transitory, tangible computer-readable storage medium on which computer readable instructions of a program are stored.

The instructions, when executed by one or more processors of a first communication device, cause the one or more processors to perform a method. The method includes receiving, from a second communication device, an indication of an amount of received power at the second communication device; receiving one or more measurements related to a state of the first communication device; estimating a state of a plurality of components of the first communication device based on the received one or more measurements and the received indication; using the received indication and the estimated state of the plurality of components, determining whether the amount of received power is likely to fall below a minimum received power within a given time interval; when it is determined that the amount of received power is likely to fall below the minimum received power within the given time interval, selecting an adjustment technique of a plurality of adjustment techniques for adjusting a data rate of an outbound signal from the first communication device; and adjusting a given component of the first communication device using the selected adjustment technique to change the data rate of the outbound signal.

In one example, selecting the adjustment technique includes using the estimated state of the one or more components to determine an amount of information able to be transmitted using a given adjustment technique. In this example, selecting the adjustment technique is based on the determined amount of information. In another example, the plurality of adjustment techniques includes changing a duty cycle of the outbound signal, changing a modulation format of the outbound signal, changing a baud rate of the outbound signal, or changing a bandwidth of the outbound signal. In a further example, estimating the state of the plurality of components includes estimating a plurality of disturbance values to the first communication device for a given timeframe according to the received one or more measurements and the received indication, each disturbance value being associated with a set of components of the first communication device.

DETAILED DESCRIPTION

Overview

The technology relates to an adaptive rate modem configured to adjust a transmitted data rate according to a received power. In particular, the adaptive data rate modem may be configured to determine a state of a communication system and select an adjustment technique from a plurality of adjustment techniques according to the status.

The features described above may provide a communication system that is designed to trade off overall throughput for better availability. The system will be able to adjust to atmospheric influences such as haze or fog, as well as system component influences. As a result, a desired data throughput level may be better maintained during disturbances and may be degraded more gradually than when using a fixed rate modem. Greater availability of communication links allows for a more robust network and a more consistent user experience.

Example Systems

Figure 1:
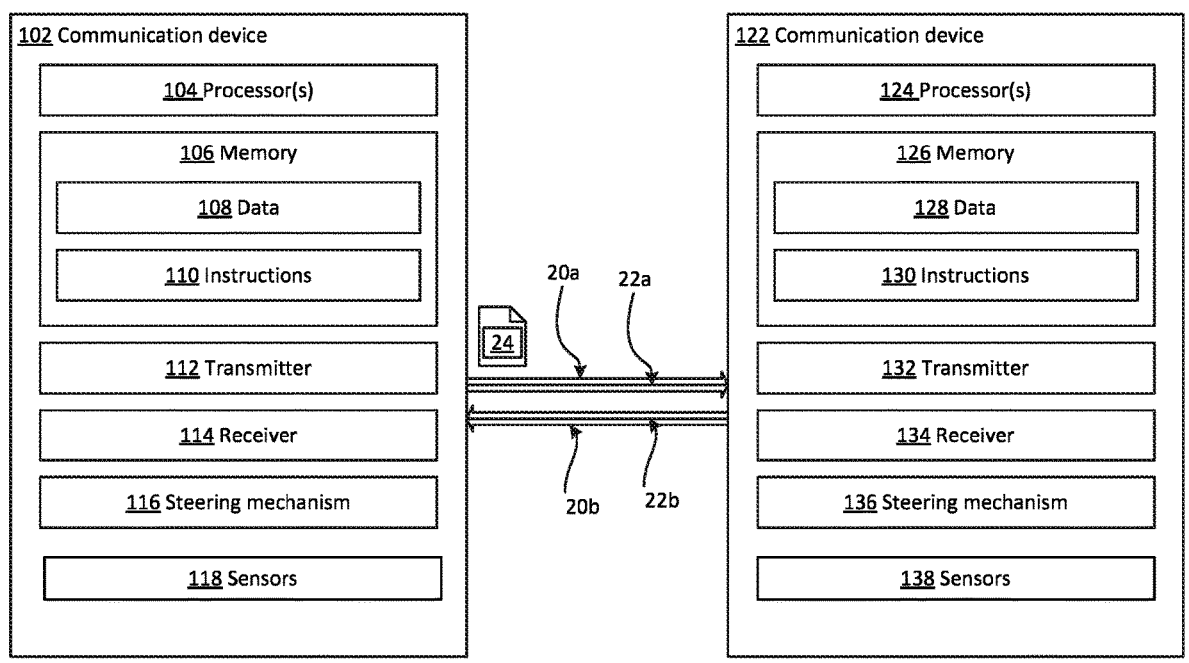
FIG. 1 is a block diagram 100 of a first communication device and a second communication device in accordance with aspects of the disclosure.

FIG. 1 is a block diagram 100 of a first communication device 102 of a first communication terminal configured to form one or more links with a second communication device 122 of a second communication terminal, for instance as part of a system such as a free-space optical communication (FSOC) system. For example, the first communication device 102 includes as components one or more processors 104, a memory 106, a transmitter 112, a receiver 114, a steering mechanism 116, and one or more sensors 118. The first communication device 102 may include other components not shown in FIG. 1.

The one or more processors 104 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 1 functionally illustrates the one or more processors 104 and memory 106 as being within the same block, the one or more processors 104 and memory 106 may actually comprise multiple processors and memories that may or may not be stored within the same physical housing. Accordingly, references to a processor or computer will be understood to include references to a collection of processors or computers or memories that may or may not operate in parallel.

Memory 106 may store information accessible by the one or more processors 104, including data 108, and instructions 110, that may be executed by the one or more processors 104. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the data 108 and instructions 110 are stored on different types of media. In the memory of each communication device, such as memory 106, calibration information may be stored, such as one or more offsets determined for tracking a signal.

Data 108 may be retrieved, stored or modified by the one or more processors 104 in accordance with the instructions 110. For instance, although the technology is not limited by any particular data structure, the data 108 may be stored in computer registers, in a relational database as a table having a plurality of different fields and records, XML documents or flat files.

The instructions 110 may be any set of instructions to be executed directly (such as machine code) or indirectly (such as scripts) by the one or more processors 104. For example, the instructions 110 may be stored as computer code on the computer-readable medium. In that regard, the terms "instructions" and "programs" may be used interchangeably herein. The instructions 110 may be stored in object code format for direct processing by the one or more processors 104, or in any other computer language including scripts or collections of independent source code modules that are interpreted on demand or compiled in advance. Functions, methods and routines of the instructions 110 are explained in more detail below.

The one or more processors 104 are in communication with the transmitter 112 and the receiver 114. Transmitter 112 and receiver 114 may be part of a transceiver arrangement in the first communication device 102. The one or more processors 104 may therefore be configured to transmit, via the transmitter 112, data in a signal, and also may be configured to receive, via the receiver 114, communications and data in a signal. The received signal may be processed by the one or more processors 104 to extract the communications and data.

The transmitter 112 may include a digital to analog converter. In addition, the transmitter 112 may be configured to output a beacon beam 20 that allows one communication device to locate another communication device. The transmitter may also be configured to output a communication beam over a communication link 22. The signal that is output from the transmitter 112 may therefore include the beacon beam 20, the communication signal, or both. The communication beam may be configured to carry a signal through free space, such as, for example, a radio-frequency signal or optical signal. In some cases, the transmitter may include a separate beacon transmitter configured to transmit the beacon beam and one or more communication link transmitters configured to transmit the communication beam. Alternatively, the transmitter 112 may include one transmitter configured to output both the beacon beam and the communication signal. The beacon beam 20 may illuminate a larger solid angle in space than the communication beam used in the communication link 22, allowing a communication device that receives the beacon beam to better locate the beacon beam. For example, the beacon beam carrying a beacon signal may cover an angular area on the order of a square milliradian, and the optical communication beam carrying a communication signal may cover an angular area on the order of a hundredth of a square milliradian.

As shown in FIG. 1, the transmitter 112 of the first communication device 102 is configured to output a beacon beam 20a to establish a communication link 22a with the second communication device 122, which receives the beacon beam 20a. The first communication device 102 may align the beacon beam 20a co-linearly with the communication beam (not shown) that has a narrower solid angle than the beacon beam 20a and carries a communication signal 24. As such, when the second communication device 122 receives the beacon beam 20a, the second communication device 122 may establish a line-of-sight link with the first communication device 102 or otherwise align with the first communication device. As a result, the communication link 22a, which allows for the transmission of the communication beam (not shown) from the first communication device 102 to the second communication device 122, may be established.

The receiver 114 may include an optical fiber and a tracking system configured to detect an optical signal. The tracking system may include at least a tracking sensor. In addition, the tracking system may also include a lens, mirror, or other system configured to divert a portion of a received optical beam to the tracking sensor and allow the remaining portion of the received optical beam to couple with the optical fiber. The tracking sensor may include, but is not limited to, a position sensitive detector (PSD), a charge-coupled device (CCD) camera, a focal plane array, a photodetector, a quad-cell detector array, or a CMOS sensor. The tracking sensor is configured to detect a signal location at the tracking sensor and convert the received optical beam into an electric signal using the photoelectric effect. The receiver 114 may also include an analog to digital converter. The receiver 114 is able to track the received optical signal, which may be used to direct the steering mechanism 116 to counteract disturbances due to scintillation and/or platform motion.

Furthermore, the one or more processors 104 are in communication with the steering mechanism 116 for adjusting the pointing direction of the transmitter 112, receiver 114, and/or optical signal. The steering mechanism 116 may include one or more mirrors that steer an optical signal through the fixed lenses and/or a gimbal configured to move the transmitter 112 and/or the receiver 114 with respect to the communication device. In particular, the steering mechanism 116 may be a MEMS 2-axis mirror, 2-axis voice coil mirror, or piezo electronic 2-axis mirror. The steering mechanism 116 may be configured to steer the transmitter, receiver, and/or optical signal in at least two degrees of freedom, such as, for example, yaw and pitch. The adjustments to the pointing direction may be made to acquire a communication link, such as communication link 22, between the first communication device 102 and the second communication device 122. To perform a search for a communication link, the one or more processors 104 may be configured use the steering mechanism 116 to point the transmitter 112 and/or the receiver 114 in a series of varying directions until a communication link is acquired. In addition, the adjustments may optimize transmission of light from the transmitter 112 and/or reception of light at the receiver 114.

The one or more processors 104 are also in communication with the one or more sensors 118. The one or more sensors 118, or estimators, may be configured to monitor a state of the first communication device 102. The one or more sensors may include an inertial measurement unit (IMU), encoders, accelerometers, or gyroscopes configured to measure one or more of pose, angle, velocity, torques, as well as other forces. In addition, the one or more sensors 118 may include one or more sensors configured to measure one or more environmental conditions such as, for example, temperature, wind, radiation, precipitation, humidity, etc. In this regard, the one or more sensors 118 may include thermometers, barometers, hygrometers, etc. While the one or more sensors 118 are depicted in FIG. 1 as being in the same block as the other components of the first communication device 102, in some implementations, some or all of the one or more sensors may be separate and remote from the first communication device 102.

The second communication device 122 includes one or more processors 124, a memory 126, a transmitter 132, a receiver 134, a steering mechanism 136, and one or more sensors 138. The one or more processors 124 may be similar to the one or more processors 104 described above. Memory 126 may store information accessible by the one or more processors 124, including data 128 and instructions 130 that may be executed by processor 124. Memory 126, data 128, and instructions 130 may be configured similarly to memory 106, data 108, and instructions 110 described above. In addition, the transmitter 132, the receiver 134, and the steering mechanism 136 of the second communication device 122 may be similar to the transmitter 112, the receiver 114, and the steering mechanism 116 described above.

Like the transmitter 112, transmitter 132 may include a digital to analog converter and may be configured to output both an communication beam and a beacon beam. For example, transmitter 132 of the second communication device 122 may output a beacon beam 20b to establish a communication link 22b with the first communication device 102, which receives the beacon beam 20b. The second communication device 122 may align the beacon beam 20b co-linearly with the communication beam (not shown) that has a narrower solid angle than the beacon beam and carries another communication signal. As such, when the first communication device 102 receives the beacon beam 20a, the first communication device 102 may establish a line-of-sight with the second communication device 122 or otherwise align with the second communication device. As a result, the communication link 22b, that allows for the transmission of the communication beam (not shown) from the second communication device 122 to the first communication device 102, may be established.

Like the receiver 114, the receiver 134 includes an optical fiber and a tracking system configured to detect an optical signal with same or similar features as described above with respect to receiver 114. In addition, the tracking system may also include a lens, mirror, or other system configured to divert a portion of a received optical beam to the tracking sensor and allow the remaining portion of the received optical beam to couple with the optical fiber. The receiver 134 may also include an analog to digital converter. The receiver 134 may also be able to track the received optical signal, which may be used to direct the steering mechanism 136 to counteract disturbances due to scintillation and/or platform motion.

The one or more processors 124 may be in communication with the steering mechanism 136 for adjusting the pointing direction of the transmitter 132, receiver 134, and/or optical signal, as described above with respect to the steering mechanism 116. The adjustments to the pointing direction may be made to establish acquisition and connection link, such as communication link 22, between the first communication device 102 and the second communication device 122. In addition, the one or more processors 124 may be in communication with the one or more sensors 138 as described above with respect to the one or more sensors 118. The one or more sensors 138 may be configured to monitor a state of the second communication device 122 in a same or similar manner that the one or more sensors 118 are configured to monitor the state of the first communication device 102.

As shown in FIG. 1, the communication links 22a and 22b may be formed between the first communication device 102 and the second communication device 122 when the transmitters and receivers of the first and second communication devices are aligned, or in a linked pointing direction. Using the communication link 22a, the one or more processors 104 can send communication signals to the second communication device 122. Using the communication link 22b, the one or more processors 124 can send communication signals to the first communication device 102. In some examples, it is sufficient to establish one communication link 22 between the first and second communication devices 102, 122, which allows for the bi-directional transmission of data between the two devices. The communication links 22 in these examples are FSOC links. In other implementations, one or more of the communication links 22 may be radio-frequency communication links or other type of communication link capable of travelling through free space.

Figure 2:
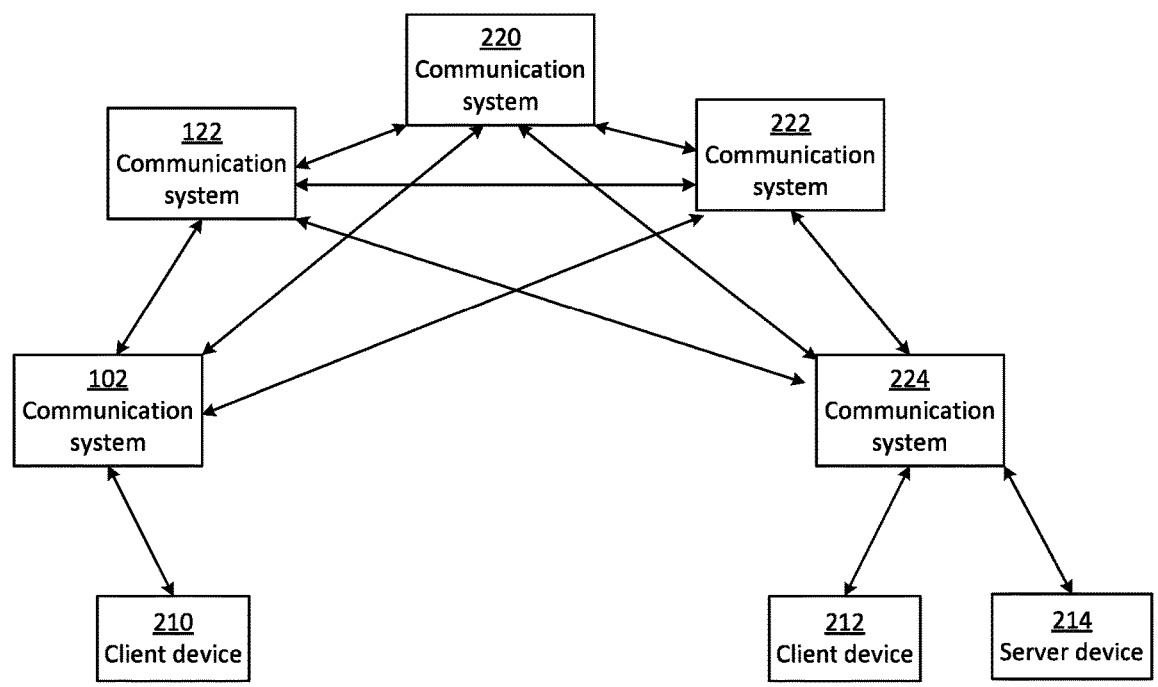
FIG. 2 is a pictorial diagram of a network 200 in accordance with aspects of the disclosure.

As shown in FIG. 2, a plurality of communication devices, such as the first communication device 102 and the second communication device 122, may be configured to form a plurality of communication links (illustrated as arrows) between a plurality of communication terminals, thereby forming a network 200. The network 200 may include client devices 210 and 212, server device 214, and communication devices 102, 122, 220, 222, and 224. Each of the client devices 210, 212, server device 214, and communication devices 220, 222, and 224 may include one or more processors, a memory, a transmitter, a receiver, and a steering mechanism similar to those described above. Using the transmitter and the receiver, each communication device in network 200 may form at least one communication link with another communication device, as shown by the arrows. The communication links may be for optical frequencies, radio frequencies, other frequencies, or a combination of different frequency bands. In FIG. 2, the communication device 102 is shown having communication links with client device 210 and communication devices 122, 220, and 222. The communication device 122 is shown having communication links with communication devices 102, 220, 222, and 224.

The network 200 as shown in FIG. 2 is illustrative only, and in some implementations the network 200 may include additional or different communication terminals. The network 200 may be a terrestrial network where the plurality of communication devices is on a plurality of ground communication terminals. In other implementations, the network 200 may include one or more high-altitude platforms (HAPs), which may be balloons, blimps or other dirigibles, airplanes, unmanned aerial vehicles (UAVs), satellites, or any other form of high altitude platform, or other types of moveable or stationary communication terminals. In some implementations, the network 200 may serve as an access network for client devices such as cellular phones, laptop computers, desktop computers, wearable devices, or tablet computers. The network 200 also may be connected to a larger network, such as the Internet, and may be configured to provide a client device with access to resources stored on or provided through the larger computer network.

Example Methods

Figure 3:
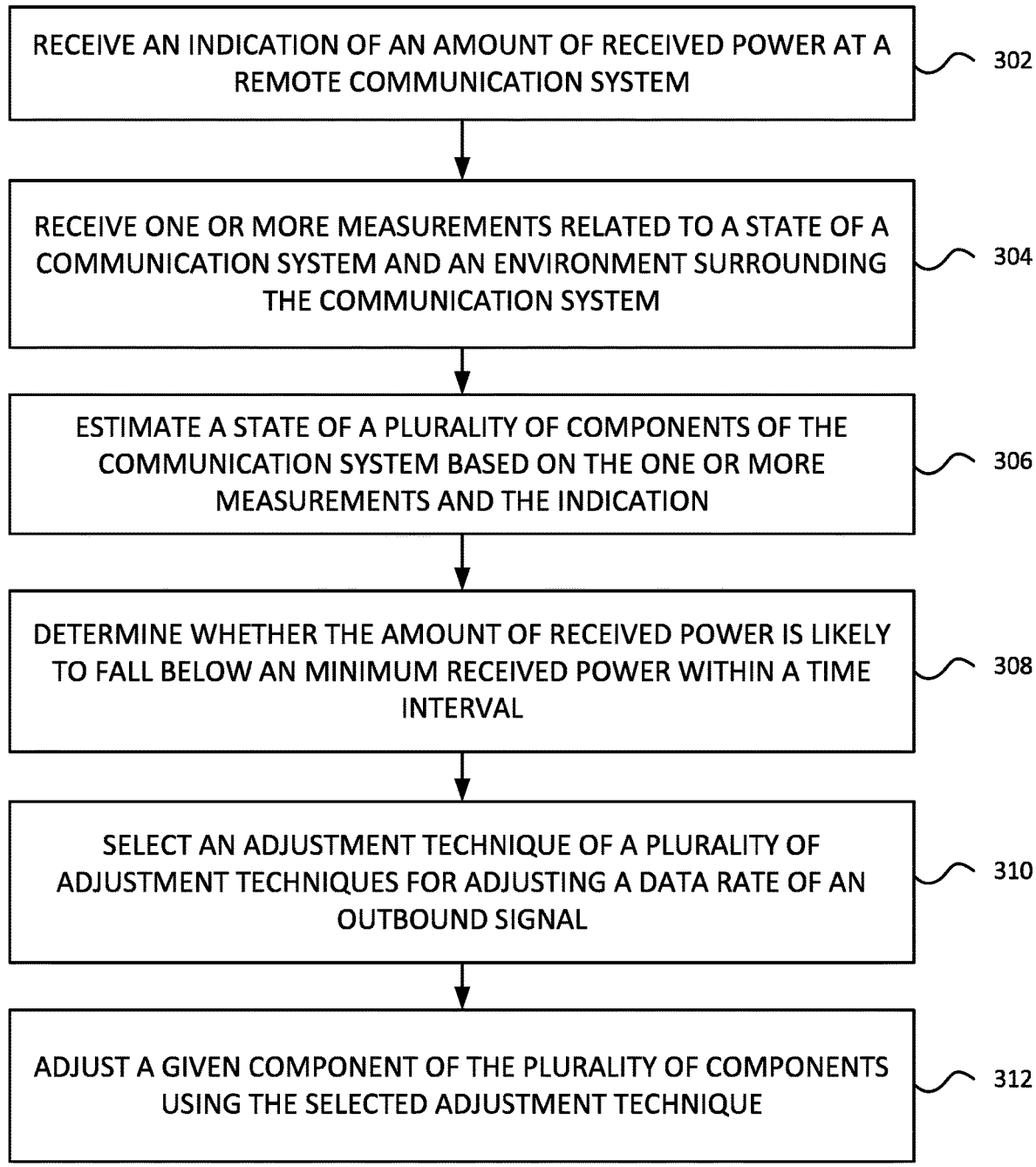
FIG. 3 is a flow diagram 300 depicting a method in accordance with aspects of the disclosure.

While connected, the one or more processors 104 of the first communication device 102 may send data to the second communication device 122 using a transmitted signal at a set data rate. The one or more processors 104 also may be able to adjust the data rate, modulation, or other feature of a transmitted signal over a communication link with the second communication device 122 as described below. In some implementations, the one or more processors 124 of the second communication device 122 may also be configured to adjust the data rate, modulation, or other feature of a transmitted signal in a same way. In FIG. 3, flow diagram 300 is shown in accordance with aspects of the disclosure that may be performed by the one or more processors 104 and/or the one or more processors 124. While FIG. 3 shows blocks in a particular order, the order may be varied and that multiple operations may be performed simultaneously. Also, operations may be added or omitted.

At block 302, the one or more processors 104 of the first communication device 102 are configured to receive an indication of an amount of received power for a communication link from the second communication device 122. The indication may be a relative received signal strength indicator, received error rate, or other type of measurement. The indication may be received via an optical signal, a RF signal, etc. from the second communication device 122. The indication may be received continually or at regular intervals, such as every 0.1 seconds or more or less. Each indication may be stored in the memory of the first communication device 102.

At block 304, the one or more processors 104 also receive measurements related to a state of the first communication device 102 and an environment surrounding the first communication device 102. The measurements may be received from the one or more sensors 118 of the first communication device 102 or from a remote database. The measurements may include, for example, orientation of the first communication device 102, frequency of vibration of the first communication device 102, output power, scintillation, channel attenuation, received power from the second communication device 122, received error rate from the second communication device 122, altitude, humidity, temperature, wind patterns, weather patterns, etc. The measurements may be received continually or at regular intervals, such as every 0.1 seconds or more or less. Each measurement may be stored in the memory of the first communication device 102.

At block 306, the one or more processors 104 estimate a state of one or more components of the first communication device 102. Estimating the state may include determining one or more disturbance values to the first communication device 102 according to the received indication and the received measurements. Each disturbance value may be an average amount of change in power over a given timeframe. For example, a first disturbance value may be estimated by determining an average amount of change of the indication over a first timeframe, for instance, which may be on the order of months, weeks, or days, or more or less. The first timeframe may be selected according to a first time constant for variation of a component of the first communication device 102. The first time constant may be the amount of time over which a measurement related to the component changes by a predetermined factor, such as a factor of 1-1/e (or approximately 0.6321). The first time constant may be known or may be determined using the received measurements. The first timeframe may be equal to the first time constant. Estimating the state of the one or more components may also include extrapolating the one or more disturbance values to a future time in order to predict a future state of the one or more components.

At block 308, using the received indication and the estimated state of the one or more components, the one or more processors 104 determine whether the amount of received power is likely to fall below a minimum received power within a time interval. The minimum received power may be an amount for which a communication link is required to operate with its current settings, such as the set data rate, a current duty cycle, a current modulation scheme, a current baud rate, and a current number of wavelengths. For example, the minimum received power may be a set amount of power required for a receiver of the second communication device 122 or alternatively an amount of power present in the environment of the first communication device 102 and the second communication device 122. The one or more processors 104 may track the amount of received power over a set time interval, such as 1 second, 5 minutes, 1 hour, or more or less, to identify a first trend of the amount of received power over the set time interval. The first trend may be, for example, an average change over the set time frame. The first trend may be extrapolated over a next time interval to predict whether the amount of received power will fall below a minimum received power threshold in the next time interval.

In some implementations, one or more other minimum received powers may be determined for one or more different settings, such as a second data rate, a second duty cycle, a second modulation scheme, a second baud rate, and/or a second number of wavelengths. For example, the one or more other minimum received powers may be determined for a plurality of combinations of possible settings. Each of the plurality of combinations may vary in at least one setting that is used in an adjustment technique for adjusting a data rate of a transmitted signal from the first communication device 102, as discussed further below.

At block 310, when it is determined that the amount of received power is likely to fall below the minimum received power within the time interval, the one or more processors 104 select an adjustment technique of a plurality of adjustment techniques for adjusting a data rate of a transmitted signal from the first communication device 102. The plurality of adjusting techniques may include, for instance, changing a duty cycle of the transmitter, changing a baud rate, changing a code rate (such as by changing a rate of an error correction code), changing a modulation format (such as OOK or PAM-4), changing a bandwidth of the transmitted signal (such as number of wavelengths), etc.

Selecting the adjustment technique may be based on the estimated state of the one or more components. Namely, the estimated state of the one or more components may be used to determine an efficiency of data transmission for a given adjustment technique. The efficiency of the data transmission may be determined based on the set data rate or a highest data rate that is possible at the amount of received power in the set time interval or a predicted amount of received power in the next time interval. Determining the efficiency using the estimated state may include determining an amount of transition time required by a given adjustment technique, an operating capacity of a component associated with a given adjustment technique, implementation costs, current channel utilization metrics, and/or power consumption to the first communication device 102 for the adjustment technique. In particular, determining the amount of information able to be transmitted using the given adjustment technique may include determining maximum channel capacity possible using the given adjustment technique for the amount of received power in the set time interval or a predicted amount of received power in the next time interval. Greater efficiency of data transmission may be associated with a component operating at a greater capacity, faster implementation, ability to transmit a greater amount of information, less power consumption, or a combination of these. When the given adjustment technique is determined to transmit data more efficiently, the given adjustment technique may be selected over other adjustment techniques of the plurality of adjustment techniques. In this example, changing the duty cycle may be selected as the adjustment technique because doing so is quick, power efficient, and has low implementation costs.

At block 312, the one or more processors 104 adjust a given component of the first communication device 102 using the selected adjustment technique to change the data rate of the transmitted signal. The data rate may be changed to the highest data rate that is possible for the amount of received power in the set time interval or a predicted amount of received power in the next time interval. Adjusting the given component may include controlling the transmitter 112 to increase or decrease the duty cycle, baud rate, code rate, or bandwidth of the output signal. Adjusting the given component may optionally include switching from one modulation format to another. The process may then be repeated until no further adjustments may be made or until the one or more processors 104 determine that normal operation may be resumed based on the received measurements returning to more favorable conditions. The process may be repeated on at intervals on the order of milliseconds, or more or less.

When the process is repeated, the selected adjustment technique may be the same as the previously performed adjustment technique, but the adjustment performed by the one or more processors 104 using the selected adjustment technique may differ from the previous adjustment. For example, a first adjustment may be performed as a decrease in the duty cycle, or a decrease in the ratio of "on" cycle to "off" cycle, and a second adjustment may be a further decrease in the duty cycle. Alternatively, the selected adjustment technique may be a different adjustment technique from the previously performed adjustment technique when the different adjustment technique is determined to be more efficient than the previously performed adjustment technique. For example, the first adjustment technique may be adjusting the duty cycle. The one or more processors 104 may determine that changing the modulation format is more efficient than the adjusting the duty cycle for the next time interval and may select changing the modulation format as the second adjustment technique for the next time interval.

Figure 4:
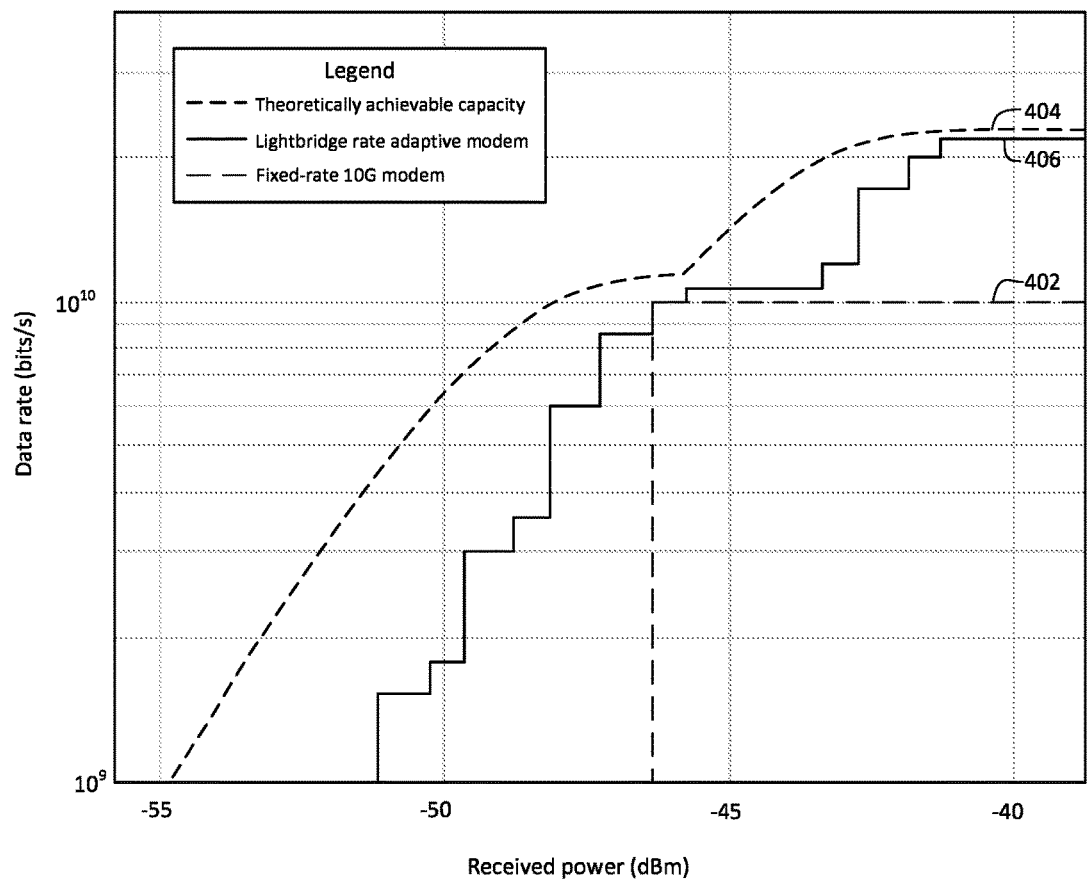
FIG. 4 is a graph 400 depicting a method of operating a communication device in accordance with aspects of the disclosure.

As shown in FIG. 4, each adjustment technique may be performed as the amount of received power decreases. As discussed above, the amount of received power may be received from the second communication device 122, as shown in block 302. For a fixed-rate 10G modem, the one or more processors 104 would not be able to make incremental adjustments to the data rate, as shown by dashed line 402. The dashed line 402 shows that the fixed-rate 10G modem is only operational at 10G, and is not operation when the received power is below a given received power, such as approximately −47 decibel-milliwatts. Using an adaptive rate modem, as described herein, a theoretically achievable capacity may extend further than the fixed-rate 10G modem, as shown by dash-dot line 404. The dash-dot line 404 shows that the one or more processors 104 is theoretically able to operate the communication device past the −47 decibel-milliwatts limit of the fixed rate 10G modem at least until −55 decibel-milliwatts. In actual operation, the one or more processors 104 may perform given adjustment techniques within given ranges of received power, resulting in a stepped line chart as shown by line 406. The line 406 shows that the one or more processors 104 are able to decrease the data rate of the transmitted signal with each adjustment for a given received power range. As shown in FIG. 4, the line 406 generally follows the slope of the dash-dot line 404 for the theoretically achievable capacity. As such, the one or more processors 104 is able to provide a more gradual decay of the communication link as the received power decreases, rather than an abrupt cut off at a higher given received power, as with operating a fixed-rate 10G modem shown by dashed line 402.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A communication system configured to transmit an outbound signal to a remote communication system, the communication system comprising:
    one or more sensors configured to receive one or more measurements related to a state of the communication system;
    a plurality of components; and
    one or more processors in communication with the one or more sensors, the one or more processors configured to:
        receive, from the remote communication system, an indication of an amount of received power at the remote communication system;
        estimate a state of the plurality of components based on the received one or more measurements and the received indication;
        using the received indication and the estimated state of the plurality of components, determine whether the amount of received power is likely to fall below a minimum received power within a given time interval;
        when it is determined that the amount of received power is likely to fall below the minimum received power within the given time interval, select an adjustment technique of a plurality of adjustment techniques for adjusting a data rate of the outbound signal; and
        adjust a given component of the communication system using the selected adjustment technique to change the data rate of the outbound signal.

2. The communication system of claim 1, wherein the adjustment technique is selected based on the estimated state of the plurality of components to determine an amount of information able to be transmitted using a given adjustment technique.

3. The communication system of claim 1, wherein the adjustment technique is selected based on the estimated state of the plurality of components to determine an operating capacity of a component associated with a given adjustment technique.

4. The communication system of claim 1, wherein the adjustment technique is selected based on the estimated state of the plurality of components to determine an amount of transition time required by a given adjustment technique.

5. The communication system of claim 1, wherein the adjustment technique is selected based on the estimated state of the plurality of components to determine a power consumption to the communication system for a given adjustment technique.

6. The communication system of claim 1, wherein the adjustment technique is selected according to one or more of an operating capacity of a component associated with a given adjustment technique, an amount of transition time required by the given adjustment technique, an amount of information able to be transmitted using the given adjustment technique, or a power consumption to the communication system for the given adjustment technique.

7. The communication system of claim 1, wherein the plurality of adjustment techniques includes at least changing a duty cycle of the outbound signal, changing a modulation format of the outbound signal, changing a baud rate of the outbound signal, or changing a bandwidth of the outbound signal.

8. The communication system of claim 1, wherein the state of the plurality of components is estimated according to an estimated plurality of disturbance values to the communication system for a given timeframe according to the received one or more measurements and the received indication, each disturbance value being associated with a set of components of the communication system.

9. A method of operating a first communication device, the method comprising:
receiving, by one or more processors of the first communication device, an indication of an amount of received power at a second communication device;
receiving, by the one or more processors, one or more measurements related to a state of the first communication device;
estimating, by the one or more processors, a state of a plurality of components of the first communication device based on the received one or more measurements and the received indication;
using the received indication and the estimated state of the plurality of components, the one or more processors determine whether the amount of received power is likely to fall below a minimum received power within a given time interval;
when it is determined that the amount of received power is likely to fall below the minimum received power within the given time interval, the one or more processors select an adjustment technique of a plurality of adjustment techniques for adjusting a data rate of an outbound signal from the first communication device; and
adjusting, by the one or more processors, a given component of the first communication device using the selected adjustment technique to change the data rate of the outbound signal.

10. The method of claim 9, wherein selecting the adjustment technique includes using the estimated state of the plurality of components to determine an amount of information able to be transmitted using a given adjustment technique.

11. The method of claim 9, wherein selecting the adjustment technique includes using the estimated state of the plurality of components to determine an operating capacity of a component associated with a given adjustment technique.

12. The method of claim 9, wherein selecting the adjustment technique includes using the estimated state of the plurality of components to determine an amount of transition time required by a given adjustment technique.

13. The method of claim 9, wherein selecting the adjustment technique includes using the estimated state of the plurality of components to determine a power consumption to the first communication device for a given adjustment technique.

14. The method of claim 9, wherein the adjustment technique is selected according to one or more of an operating capacity of a component associated with a given adjustment technique, an amount of transition time required by the given adjustment technique, an amount of information able to be transmitted using the given adjustment technique, or a power consumption to the first communication device for the given adjustment technique.

15. The method of claim 9, wherein the plurality of adjustment techniques includes changing a duty cycle of the outbound signal, changing a modulation format of the outbound signal, changing a baud rate of the outbound signal, or changing a bandwidth of the outbound signal.

16. A non-transitory, tangible computer-readable storage medium on which computer readable instructions of a program are stored, the instructions, when executed by one or more processors of a first communication device, cause the one or more processors to perform a method, the method comprising:
receiving, from a second communication device, an indication of an amount of received power at the second communication device;
receiving one or more measurements related to a state of the first communication device;
estimating a state of a plurality of components of the first communication device based on the received one or more measurements and the received indication;
using the received indication and the estimated state of the plurality of components, determining whether the amount of received power is likely to fall below a minimum received power within a given time interval;
when it is determined that the amount of received power is likely to fall below the minimum received power within the given time interval, selecting an adjustment technique of a plurality of adjustment techniques for adjusting a data rate of an outbound signal from the first communication device; and
adjusting a given component of the first communication device using the selected adjustment technique to change the data rate of the outbound signal.

17. The medium of claim 16, wherein selecting the adjustment technique includes using the estimated state of the one or more components to determine an amount of information able to be transmitted using a given adjustment technique.

18. The medium of claim 17, wherein selecting the adjustment technique is based on the determined amount of information.

19. The medium of claim 16, wherein the plurality of adjustment techniques includes changing a duty cycle of the outbound signal, changing a modulation format of the outbound signal, changing a baud rate of the outbound signal, or changing a bandwidth of the outbound signal.

20. The medium of claim 16, wherein estimating the state of the plurality of components includes estimating a plurality of disturbance values to the first communication device for a given timeframe according to the received one or more measurements and the received indication, each disturbance value being associated with a set of components of the first communication device.

* * * * *